Sept. 18, 1928.
J. A. DIRSCHAUER
AGRICULTURAL MACHINE
Filed Aug. 25, 1927
1,684,861
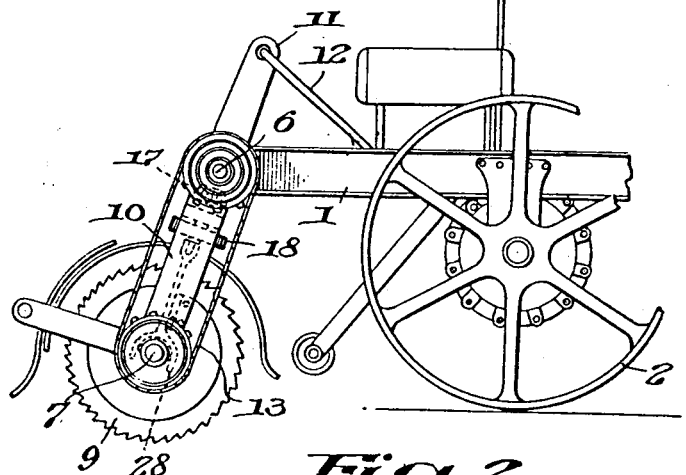
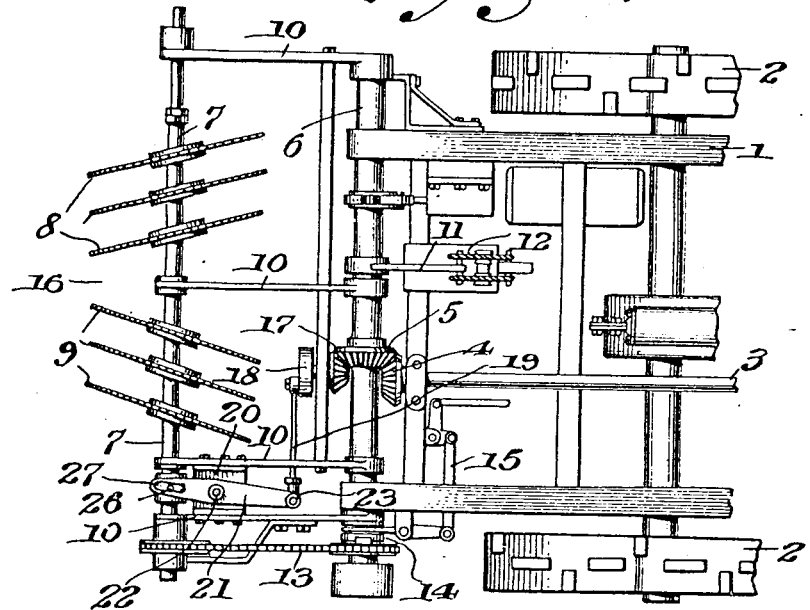
Inventor,
Jacob August Dirschauer Patented Sept. 18, 1928.

1,684,861

UNITED STATES PATENT OFFICE.

JACOB AUGUST DIRSCHAUER, OF EVANSVILLE, INDIANA.

AGRICULTURAL MACHINE.

Application filed August 25, 1927. Serial No. 215,476.

The present improvements relate to that general class of agricultural machines having a gang of soil or earth-treating discs or cutters arranged in a gang or gangs crosswise of the machine and whose purpose is to pulverize soil, destroy weeds, wild onion sprouts, cut-worms, grub-worms, Japanese beetle, corn borer worms, cotton boll weevil, moths, and other injurious insects and vegetation and will serve the purpose of a plow, harrow, drag, and other soil-treating machines.

The object of the invention is to provide improved means whereby the gang of cutters or discs will be shifted bodily as a unit in general crosswise relationship to the line of draft, so that the rotating cutters or discs will treat the entire width of soil or ground traversed by the machine when the latter progresses.

The present improvements relate more particularly to improved means for automatically bodily shifting crosswise of the machine that type of discs or cutters set forth in the patent to Dick and Dirschauer No. 1,635,612 July 12, 1927, and the joint application of the same parties, Serial No. 142,046, filed October 16, 1926.

One embodiment of the invention is hereinafter described and is shown in the accompanying drawings in connection with so much of a machine of the type set forth in the aforesaid application, Serial No. 142,046, as will enable a full understanding to be had of the manner in which the gangs of cutters or discs such as set forth in that application may be shifted bodily crosswise of the machine while they are rotating to treat the soil.

The arrangement of discs set forth in the aforesaid application and patent, particularly those of the aforesaid application, tends to leave in between the two gangs an uncultivated or untreated width of soil. My present invention, by providing means for shifting the gangs to and fro crosswise of the machine, alternately brings the gangs into position where they necessarily must treat this neglected width of soil and thus a complete treatment of the ground traversed by the machine is obtained.

In the accompanying drawings:

Figure 1, is a side elevation showing the rear part of a machine provided with my improvements;

Fig. 2, is a plan view thereof; and

Fig. 3, is a detail view showing the arrangement for shifting the shaft which carries the discs.

The frame of the machine appears at 1, the drive wheels being shown at 2. The front part of the machine is omitted as it has no relationship to the present improvements.

The propeller shaft is shown at 3 and it carries a bevel pinion 4 which meshes with pinion 5 on the shaft 6, the said shaft being suitably journalled in the frame 1.

There is a shaft 7 which carries the gangs of serrated toothed soil-treating discs 8, 9. These disc are arranged in the two gangs, as shown in Fig. 2, where the discs of each gang are parallel and yet the discs of the respective gangs 8, 9 converge toward each other in the manner set forth in the Dick and Dirschauer application Serial No. 142,046.

The shaft 7 is carried by a frame 10 which is rockably mounted on the shaft 6, or concentrically therewith so that, by means of any suitable mechanical arrangement, not necessary to describe, for instance the parts 11 and 12, the frame 10, with the gangs 8 and 9 carried thereby, may be raised or lowered to any desired degree determined by the extent of soil penetration required.

The shaft 7 is driven from shaft 6 in any suitable manner as, for instance, by the chain and sprocket drive 13. A clutch 14 under any suitable control 15, enables the shaft 7 to be driven, or stopped.

It has been found that, with all of the advantages they possess in respect to treatment of the soil, the gangs of discs 8, 9, in a construction such as has just been described, do not cultivate a strip of soil such as lies between the adjacent discs of the respective gangs as indicated at 16 and it is the purpose of my invention to provide for the bodily lateral shifting of the gangs of discs as a unit so that they will cultivate the hitherto uncultivated strip of soil indicated at 16. I do not limit the invention to the particular mechanical means employed to effect this purpose. One such means, shown in the drawings, comprises the mechanism now to be described.

Meshing with the pinion 5 is a pinion 17 on a shaft which carries a crank wheel 18 that operates a connecting rod 19.

Carried by two of the frame pieces 10 is a plate 20 to which is pivoted a rocker 21 as indicated at 22. The connecting rod 19 is pivoted to the rocker at 23. The shaft 7 and the gangs of discs 8, 9 are slidably mounted in the frame pieces 10 so that they may be bodily shifted laterally as previously set forth. Splined to the shaft 7 is a collar 24 which is encircled by a ring 25 located in a groove therein and provided with lugs or pins 26 which project into slots 27 in the fork on the rear end of the rocker 21 as shown at 28, Fig. 1.

The means thus provided cause the gangs of discs 8, 9 to be shifted laterally, to and fro, so that the previously uncultivated strip 16 is given treatment and thus a defect is overcome.

What I claim is:

1. In an agricultural machine, the combination with a gang of soil-treating discs comprising two groups each having a set of discs similarly arranged, the discs of the respective groups being disposed in converging relationship to the discs of the other group, the groups of discs being arranged for rotation and for bodily lateral shifting as a unit, of power means for rotating said discs and power means for simultaneously shifting them bodily laterally as a unit.

2. In an agricultural machine, the combination with a gang of soil-treating discs mounted for rotation and for bodily shifting laterally as a unit, of a rocker and a crank and connecting rod constituting means for reciprocating said discs laterally as a unit, and means for driving said shifting means and for rotating the discs while they are being reciprocated.

In testimony whereof I affix my signature.

JACOB AUGUST DIRSCHAUER.